United States Patent [19]
Glover

[11] 3,889,324
[45] June 17, 1975

[54] BAND ATTACHMENT FOR PIPE REPAIR CLAMP
[75] Inventor: Charles J. Glover, Bradford, Pa.
[73] Assignee: Dresser Industries, Inc., Dallas, Tex.
[22] Filed: Oct. 12, 1973
[21] Appl. No.: 405,948

[52] U.S. Cl. .............................................. 24/279
[51] Int. Cl. .............................................. B01j 6/00
[58] Field of Search ........................ 138/99; 24/279

[56] References Cited
UNITED STATES PATENTS
| | | | |
|---|---|---|---|
| 679,139 | 7/1901 | Brett | 24/279 |
| 2,998,629 | 9/1961 | Smith | 24/279 |
| 3,195,205 | 7/1965 | Morriss et al. | 24/279 |
| 3,254,387 | 6/1966 | Smith | 24/279 |
| 3,680,180 | 8/1972 | Gould | 24/279 |

Primary Examiner—Paul R. Gilliam
Assistant Examiner—Doris L. Troutman
Attorney, Agent, or Firm—Daniel Rubin

[57] ABSTRACT

Malleable jaws of the clamp lugs define a longitudinal non-circular cavity in which to receive the band ends looped in a generally similar cross section thereof. A non-circular staking bar is longitudinally positioned within each band loop in force fit engagement therewith. In opposition to increasing draw forces tending to urge separation between the band and jaw, the bar operably acts in a rotational interlock to increase the gripping tension therebetween.

8 Claims, 3 Drawing Figures

PATENTED JUN 17 1975　　　　　　　　　　　　　　　　3,889,324

BAND ATTACHMENT FOR PIPE REPAIR CLAMP

BACKGROUND OF THE INVENTION

1. The field of art to which the invention pertains includes the art of piping and external repair products therefor.

2. Pipe repair clamps are a widely used product available from a variety of commercial sources. They are marketed in virtually all size ranges for all sorts of piping materials to enable repair of pipe on site without the necessity of replacing the damaged portion of pipe. In this manner, repair can be effected without interrupting line service and without the significantly higher cost normally associated with replacing the pipe section in need of repair.

In a common construction, pipe repair clamps include a flexible sheet metal band carrying a gasket on its inside face and capable of assuming a substantially circular configuration. The band ends are connected or anchored to a pair of spaced lugs which, when the clamp is mounted in position on a pipe, can be drawn together via bolts for tightened installation of the gasket against the pipe surface being repaired. By virtue of this arrangement, bolt tightening in the course of installation imposes a draw tension on the band stressing the connection between the band and lug increasingly tending to urge their separation and even detachment at the point of connection. Depending on the size of pipe involved, the separation forces can increase to on the order of approximately 8,000 lbs. load per bolt which, to avoid failure of the installation, must be accommodated by whatever band to lug attachment technique is employed.

Various band to lug attachment structures are known employing interlocks of sorts as, for example, disclosed in U.S. Pat. Nos. 2,897,568; 2,998,629; 3,089,212; 3,183,938; 3,195,205; and 3,195,206. While some of the attachment mechanisms disclosed by these patents are believed to function better than others, it should at the same time be recognized that the better ones are usually also relatively expensive by virtue of the special manufacturing steps associated with their fabrication. Despite recognition of the foregoing, it has not been known heretofore how to produce a simple yet reliable band to lug attachment without the attendant expense associated with attachment structures of the prior art.

SUMMARY OF THE INVENTION

This invention relates to pipe repair clamps and more particularly to improved structures for attaching the flexible clamp band in an anchored relation to the lugs thereof. In accordance with the invention, a relatively inexpensive yet reliably effective anchor connection is provided in the form of a rotational interlock tending to increase the grip between band and lug in opposition to increasing separational draw forces as to substantially eliminate the difficulty and attendant expense associated with such connections of the prior art. Effecting the interlock hereof is a non-circular cavity formed longitudinally aligned in each clamp lug and in which a complementary loop of the band end is positioned. A non-circular staking bar extends longitudinally through the band loop secured in a force fit engagement therewith such that its tendency to rotate in opposition to the imposed draw forces tending to urge separation of band and lug operably acts to increase the gripping tension therebetween.

It is, therefore, an object of the invention to provide an improved pipe repair clamp having novel structure for securing the band to the lugs thereof.

It is a further object of the invention to provide a pipe repair clamp as in the previous object in which the band is secured to the lugs by a relatively inexpensive combination of components that are operably effective to increase the gripping tension between the band and jaw in opposition to draw forces tending to urge their separation.

Figure 1:
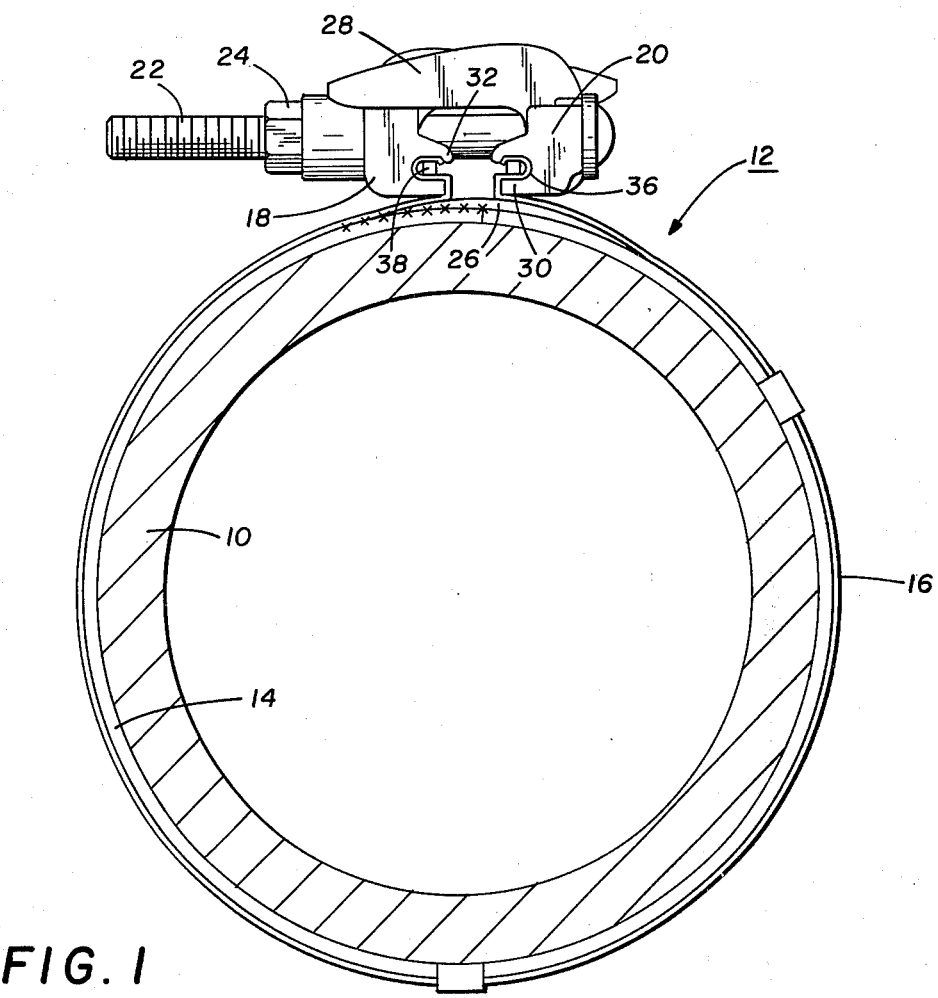
FIG. 1 is a sectional elevation of a pipe repair clamp exemplifying use of the invention hereof.

Referring initially to FIG. 1 of the drawings, there is illustrated a pipe 10 to be repaired and about which is positioned a repair clamp generally designated 12. The clamp shown may, for example, be of a basic type disclosed in U.S. Pat. No. 3,151,632. Engaging the outer surface of the pipe is a gasket 14 of resilient composition such as rubber generally carried by or attached to a flexible encircling band 16. Opposite ends of the band are secured, as will be described below, to a pair of opposing lugs 18 and 20. The lugs are adapted to be drawn together in a well known manner via a plurality of bolts 22 engaging opposite nuts 24 for tightened installation of the clamp about pipe 10. Bridging the circumferential gap between lugs is a spanner element 26, the ends of which extend in underlying relation to the arcuate termination of band 16. Torque arms 28 absorb the turning moment encountered by the lugs in the course of tightening bolts 22.

Figure 2:
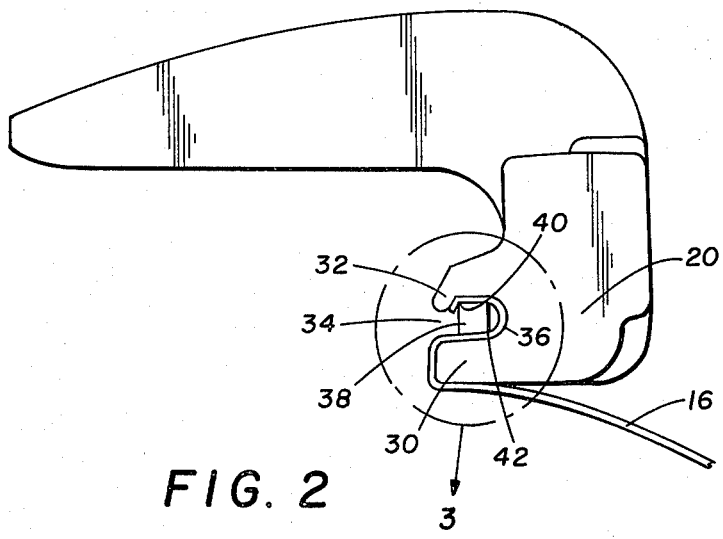
FIG. 2 is an enlarged fragmentary section illustrating the band to lug connection.
Figure 3:
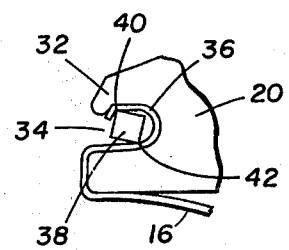
FIG. 3 is a fragmentary view from the encircled portion of FIG. 2 illustrating the effect of draw tension tending to urge separation of the band from the lug.

Anchoring of the band ends to the lugs will now be described with additional reference to FIGS. 2 and 3. Each of the lugs is of malleable metal and includes a main body flange 30 about which the band end extends radially away from spanner 26. Radially outward from flange 30 are a plurality of longitudinally spaced and obliquely terminating fingers 32. The fingers cooperate with flange 30 to comprise a malleable jaw defining an intervening longitudinal pocket or cavity 34 of non-circular cross section. Received pressed into place in a close complementary interfit within the cavity is a loop 36 of the band end of generally similar cross section. Extending longitudinally positioned internally of the loop in a force fit engagement therewith is a steel staking bar 38 likewise of non-circular cross section and preferably squared as illustrated. In this relation, the effective surfaces of the staking bar are proximate and substantially parallel to the internal wall surfaces of the cavity with band loop 36 being generally wrapped around the bar sandwiched in a tightly compressed relation against the lug.

By bar 38 being in an intervening forced relation in the foregoing arrangement, it is able to retain band 16 securely anchored to the lug against a level of draw forces normally encountered during installation take-up of bolts 22. Should, however, the normal level of draw forces be exceeded, the effect thereof because of the draw pull imposed on band 16 is for the loop wrap to initiate or prompt rotation of bar 38 in a clockwise direction as can be best understood by comparing FIGS. 2 and 3. As bar rotation is initiated, the interlock is imposed by diagonally opposite corner edges 40 and 42 increasingly biting or penetrating into band 16 for increasing the gripping tension thereat. By virtue of this self imposed gripping reaction to the draw forces incurred by bar 38, the rotational interlock operably acts to increase gripping tension between the band and jaw in correlation to increasing draw forces tending to urge their detachment or separation. The extent to which the gripping force is increased is, of course, a function of the turning movement encountered by the diagonal dimension of bar 38 across corners 40 and 42 as compared to the cross sectional height of the bar. For obvious reasons, bar 38 need not be square but can comprise a rectangle or any other suitable polygonal or non-polygonal non-circular configuration tending to produce analogous relationships.

By the above description there is disclosed a novel structure for anchoring a flexible band of a pipe repair clamp to the lug members thereof. Construction of the anchor connection represents the height of simplicity and a minimal expense as compared to prior constructions yet is reliably effective in the prevention of band pull-out by reason of the increased gripping tension which results between the band and jaw in opposition to increasing draw forces tending to urge their detachment. By the simple phenomena of prompting rotation of the bar, the rotational interlock imposed by the enlarged turning circle defined across the bar corners increasingly forces loop 36 against the wall surfaces which define cavity 34. In this arrangement, separation of the components is virtually impossible short of a component failure.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privelege is claimed are defined as follows:

1. In a pipe repair clamp, the combination comprising:
   a. a flexible band adapted to generally encircle a pipe on which repair is to be made;
   b. adjustable lug means for drawing said band into tight fitting installation engagement against the encircled pipe; and
   c. anchor means for securing an end of said band to said lug means, said anchor means including bar means supported extending within a looped wrap of said band end and responsive to draw forces increasingly imposed on said band by installation adjustment of said lug means to effect a rotational interlock between said band and said lug means that operatively increases the gripping force therebetween in correlation to the draw forces increasingly imposed on said band.

2. In a pipe repair clamp according to claim 1 in which said anchor means comprises a non-circular forced interfit securing said band against said lug means.

3. In a pipe repair clamp according to claim 2 in which said anchor means includes a longitudinally extending cavity cross sectionally defined non-circular in said lug means, a band loop of cross sectional configuration generally complementary to said cavity and positioned therein, and said bar means comprises a non-circular staking bar extending longitudinally through said loop in a force fit engagement therewith for sandwiching the band against the wall of said cavity thereat.

4. In a pipe repair clamp according to claim 3 in which said staking bar is of polygonal cross section positioned in a generally wrapped relation within said band loop.

5. In a pipe repair clamp according to claim 4 in which said staking bar is of rectangular cross section.

6. In a pipe repair clamp according to claim 4 in which said band loop wrap is responsive to excessive draw forces imposed on said band to prompt rotational displacement of said staking bar.

7. In a pipe repair clamp according to claim 6 in which adjacent surfaces of said bar define at least one corner edge effective to increasingly penetrate the surface of said band loop in correlation with the rotational displacement thereof.

8. In a pipe repair clamp according to claim 7 in which said bar surfaces define a plurality of corner edges effective substantially simultaneously to increasingly penetrate said band loop surface.

* * * * *